March 28, 1944.   R. A. HIRSCHMUGL   2,345,258

ROLLER SKATE WHEEL

Filed Feb. 8, 1940

WITNESS.
Richard J. Jacker

INVENTOR.
ROBERT AUGUST HIRSCHMUGL
J. Warren McCaffrey
ATTORNEY

Patented Mar. 28, 1944

2,345,258

UNITED STATES PATENT OFFICE 2,345,258

ROLLER SKATE WHEEL

Robert August Hirschmugl, Chicago, Ill.

Application February 8, 1940, Serial No. 317,822

6 Claims. (Cl. 301—5.3)

This invention relates in general to that class of wheels which rotate on ball bearings around an axle, such as roller skate wheels, furniture casters and the like.

There are numerous ball bearing wheels manufactured and they represent many different types of construction. The wheel of this invention has been especially designed for roller skates and features a minimum number of parts, requiring a minimum number of operations in manufacture, and resulting in a greatly reduced cost of production over many of the roller skate wheels on the market now. At the same time the inventor has not sacrificed any of the qualities that a roller skate wheel must have. It is strong and will wear as long as the wood lasts. It is constructed so simply that there is no weakening of any of its component parts.

The device of this invention will be best understood by a detailed description of the wheel and how it is constructed, supplemented by the accompanying drawing which forms part of this specification. The specification and drawing disclose a preferred embodiment of the invention but the invention is not to be limited to the roller skate wheel illustrated, but rather to be considered in the light of the specification with the variations and modifications that naturally would occur to one skilled in the art.

In the accompanying drawing

Figure 1:
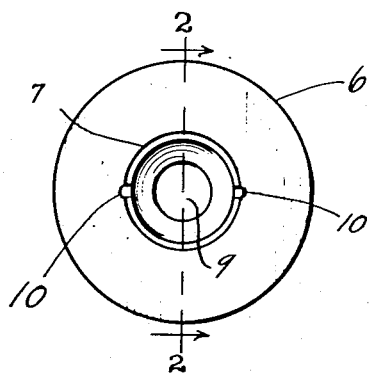
Figure 1 illustrates a side view of a roller skate wheel.

In order to better describe the wheel of this invention, which is particularly suitable for furniture casters or roller skates, with reference to the accompanying drawing, the numeral 6 designates a wheel of the type generally made out of hardwood, or any moldable or plastic composition. A bushing 7 is pressed into a cup-shaped recess 8 that has been drilled part way through wheel 6 but is not discernible in Figure 1. Hole 9 on the other hand is drilled clear through wheel 6 and permits the extension of an axle through the wheel. Very small grooves 10 are cut on the inside wall of the wheel to allow for the insertion of bushing 7 in the cup-shaped recess 8 by by providing for the passage of small protruding lugs 11, not distinguishable from grooves 10 in Figure 1.

Figure 2:
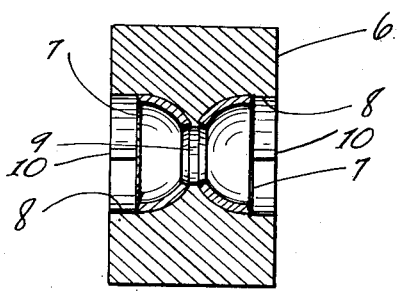
Figure 2 illustrates a sectional view of the wheel along the center line 2—2 of Figure 1.

In Figure 2 the location of two bushings 7 almost back-to-back in the cup-shaped recesses 8 drilled out of wheel 6 is clearly shown. The alignment and centering of the hole 9 through the wheel and the holes in the two bushings 7 is also shown in Figure 2.

Figure 3:
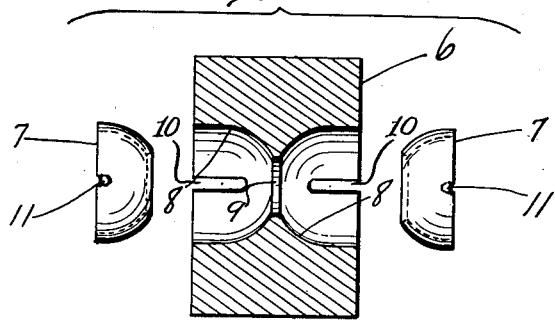
Figure 3 illustrates the same sectional view with the bushings removed.

Figure 3 shows the wheel after it has been turned out on the wood turning machines and lathes before the bushings 7 have been pressed into place. The cup-shaped recesses 8 do not meet but are connected together by hole 9. The depth of the recesses 8, or the amount of wood allowed to remain between the bushings 7, and around the axle hole 9 is important because it has direct relation to the strength, durability and wearing of the roller wheel. The circle of wood around hole 9 at the bottom of recesses 8 is shown in the drawing as being thin, but it may be any thickness being limited only by the fact that the outside edge of bushings 7 must not be flush with the outside face of the wheel, nor protrude beyond it. The bushings 7 are not shown in section in Figure 3 but in side elevation and reveal lugs 11 which move along grooves 10 shown in Figure 1.

Figure 4:
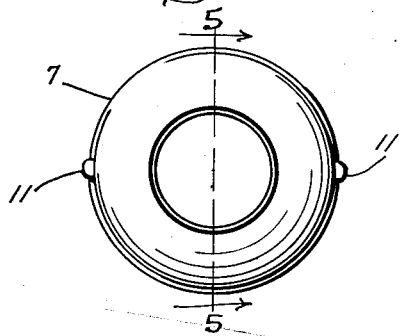
Figure 4 illustrates an enlarged rear view of a bushing, for example, the back of the bushing shown in Figure 1 if the same were visible from the back.
Figure 5:
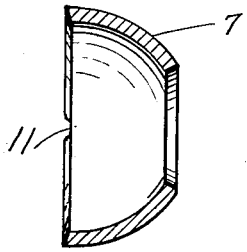
Figure 5 illustrates an enlarged sectional view of the same along the center line 5—5 of Figure 4.

Figure 4 is an enlarged rear view of bushing 7 showing protruding lugs 11 located 180° from each other, and the inner edge which is inclined to the horizontal because of the stamping operation in making the bushing. This is shown better in Figure 5 which is a sectional view taken along the line 5—5 of Figure 4 and which also shows that the outer edge of the bushing is inclined to the vertical, also as a result of the stamping out of the bushing. If desired, additional protruding lugs 11 may be employed and in such cases they should be spaced at equal intervals around the edge of the bushing.

In making the device of this invention the center hole 9 for the axle and two cup-shaped recesses 8 are drilled in the wooden wheel, or formed by the mold when the wheel is made out of any moldable or plastic material. Then the wheel is soaked in either oil or water. Two bushings, which have been stamped out of metal shaped like a washer and of a size suitable to fit the cup-shaped recesses, are simultaneously inserted into their respective recesses under pressure. Grooves 10 allow the passage of lugs 11 and under the pressure applied in the insertion the outer edges of the bushings will be compressed in very slightly, or the water soaked or oil soaked wood will distend slightly, or perhaps both will happen in small degree so as to permit the complete insertion of the two bushings in the two recesses. Immediately after the pressure used to insert the bushings is released the outer edge of the bushings will cut into the inside walls of the recesses and become embedded slightly, but enough to prevent the bushing from subsequently turning in the wheel when in use. The two or more protruding lugs around the upper edge which become embedded in the wood also help prevent the bushings and wooden wheel from working loose and turning. Figure 2 shows the upper edges of the two bushings embedded slightly in the walls of the recesses. In some cases the punching operation in forming the bushings will leave a burred outer edge of the bushing, which when embedded in the walls of the wheel may obviate the use of protruding lugs to prevent turning of the bushing in the wheel.

The wheel of this invention can be made from any suitable materials that will wear well under the usual service expected of roller skate wheels, such as hard wood, or any moldable or plastic composition, such as Bakelite, Tenite and similar hard wearing materials. A hard maple with burned or seared outside edges has given excellent results. The bushings can be punched and shaped out of any durable metal, such as brass, aluminum, iron or steel, but a metal that can endure rough treatment and give long life as a tract for ball bearings is preferred, because all the weight of the object or person supported is transferred through the ball bearings to the bushing.

Having described my invention, what I claim is:

1. A roller bearing wheel of the class described comprising a wheel having a central opening therethrough, a cup-shaped recess in each side of said wheel, a metal bushing having a conical edge completely seated within each cup-shaped recess, each bushing having a central opening concentric with the central opening in the wheel, and each bushing having a plurality of lugs around its outer edge which lugs and conical edges extend into the walls of said cup-shaped recesses.

2. A roller bearing wheel of the class described comprising a wheel having a central opening therethrough, a cup-shaped recess in each side of said wheel, a circular metal bushing having a central opening therein and seated within each cup-shaped recess, each bushing comprising a cup shaped metal member the rim of which terminates in a conical edge forming an acute angle with the outer rim surface and disposed completely within each of said recesses so that the central opening through each bushing and the wheel are concentric, and each bushing having a plurality of lugs around its outer edge which lugs and conical edges abut into the walls of said recesses.

3. A roller comprising an annular body of relatively soft material having a concentric cup shaped recess formed therein, and a bearing race bushing comprising a cup shaped metal member the rim of which terminates in a conical edge forming an acute angle with the outer rim surface said bushing being pressed into said body recess whereby the body resiliently engages the bushing and interlocks with its edge.

4. A roller comprising an annular body of relatively soft material having a concentric cup shaped recess formed therein, and a bearing race bushing comprising a cup shaped metal member the rim of which terminates in a conical edge forming an acute angle with the outer rim surface, said bushing being pressed into said body recess whereby the body resiliently engages the bushing and interlocks with its edge and said rim also including projections to further engage and interlock with said body.

5. A roller of the class described comprising an annular body of molded material having a central opening therethrough, a cup-shaped recess in each side of said roller, a metal bushing comprising a cup-shaped metal member the rim of which terminates in a conical edge forming an acute angle with the outer rim surface and having a central opening therethrough, disposed in each of said recesses, each bushing being pressed into said cup-shaped recesses whereby the annular body resiliently engages the bushings and interlocks with the conical edges of said bushings.

6. A roller skate wheel comprising an annular body of resilient material with a cup-shaped recess in each side of said body and a central opening through said body and connecting said cup-shaped recesses, a metal bushing with a central opening therethrough disposed in each of said recesses, with the openings therein aligned concentrically with the opening through said body, which bushing comprises a cup-shaped metal ball bearing race, the rim of which terminates in a saucer-like edge, forming a sharp angle with the outer rim surface, said bushings being pressed into said cup-shaped recesses whereby the walls of said recesses resiliently engage the bushings and interlock with their edges, and said rim having projections at spaced intervals to further engage and interlock with the walls of said recesses.

ROBERT AUGUST HIRSCHMUGL.